United States Patent [19]

Mowbray

[11] 3,970,414

[45] July 20, 1976

[54] LIQUID FUEL INJECTION PUMPING APPARATUS

[75] Inventor: Dorian Farrar Mowbray, Burnham, England

[73] Assignee: C.A.V. Limited, Birmingham, England

[22] Filed: Dec. 30, 1974

[21] Appl. No.: 537,410

[30] Foreign Application Priority Data

Nov. 11, 1974 United Kingdom............... 361/74

[52] U.S. Cl.............................. 417/252; 417/253; 417/462

[51] Int. Cl.²..................... F04B 3/00; F04B 19/02; F04B 29/00

[58] Field of Search.............. 417/251–253, 417/219, 462; 91/492; 137/565.1, 565.2

[56] References Cited

UNITED STATES PATENTS

| | | |
|---|---|---|
| 2,163,080 | 6/1939 | Benedik............................. 91/492 |
| 2,391,221 | 12/1945 | Beeh.............................. 137/565.2 |
| 3,494,289 | 2/1970 | Watson et al...................... 417/252 |
| 3,690,097 | 9/1972 | Widmaier........................... 91/492 |

FOREIGN PATENTS OR APPLICATIONS

| | | | |
|---|---|---|---|
| 357,920 | 12/1957 | Switzerland....................... | 417/462 |
| 952,136 | 3/1962 | United Kingdom................ | 417/251 |

*Primary Examiner*—William L. Freeh

[57] ABSTRACT

A fuel pumping apparatus for supplying fuel to an internal combustion engine includes a rotor which acts as a distributor member and has a high pressure passage for registration with an outlet port or ports and low pressure passages for registration with low pressure ports formed in the body part of the apparatus. In order to minimize leakage of the high pressure, the rotor is divided into two parts the part having the low pressure ports being of larger diameter than the part which has the high pressure ports.

15 Claims, 2 Drawing Figures

LIQUID FUEL INJECTION PUMPING APPARATUS

This invention relates to liquid fuel pumping apparatus for supplying fuel to internal combustion engines, and of the kind comprising a body part, a cylindrical rotor mounted within the body part and rotatable in synchronism with an associated engine, a transversely disposed bore formed in the rotor and a pair of pumping plungers housed therein, cam means for imparting inward movement to the plungers, first passage means in the rotor for conveying high pressure fuel discharged from the bore during successive inward movement of the plungers to successive outlet ports in turn, said outlet ports being located in the body part, a fuel feed pump for supplying fuel at a low pressure, and co-operating passage means in the rotor and body part for effecting a timed supply of fuel from the feed pump to the bore to effect outward movement of the plungers and means for controlling the amount of fuel supplied to the bore.

The object of the invention is to provide such an apparatus in a simple and convenient form.

According to the invention, in an apparatus of the kind specified, the portion of the rotor which is provided with said first passage means has a diameter smaller than the portion of the rotor which is provided with said co-operating passage means, whereby leakage of high pressure fuel may be minimised, and the size and disposition of said co-operating passage means can be chosen to provide effective filling of the bore when the associated engine is operating at high speeds.

Preferably, the aforesaid portions of the rotor are formed by forming the rotor in two parts, means being provided to couple the two parts of the rotor so that they rotate together.

Preferably the feed pump is located at least in part, in that part of the rotor which is provided with the co-operating passage menas.

One example of a fuel pumping apparatus in accordance with the invention will now be described with reference to the accompanying drawings in which.

Figure 1:
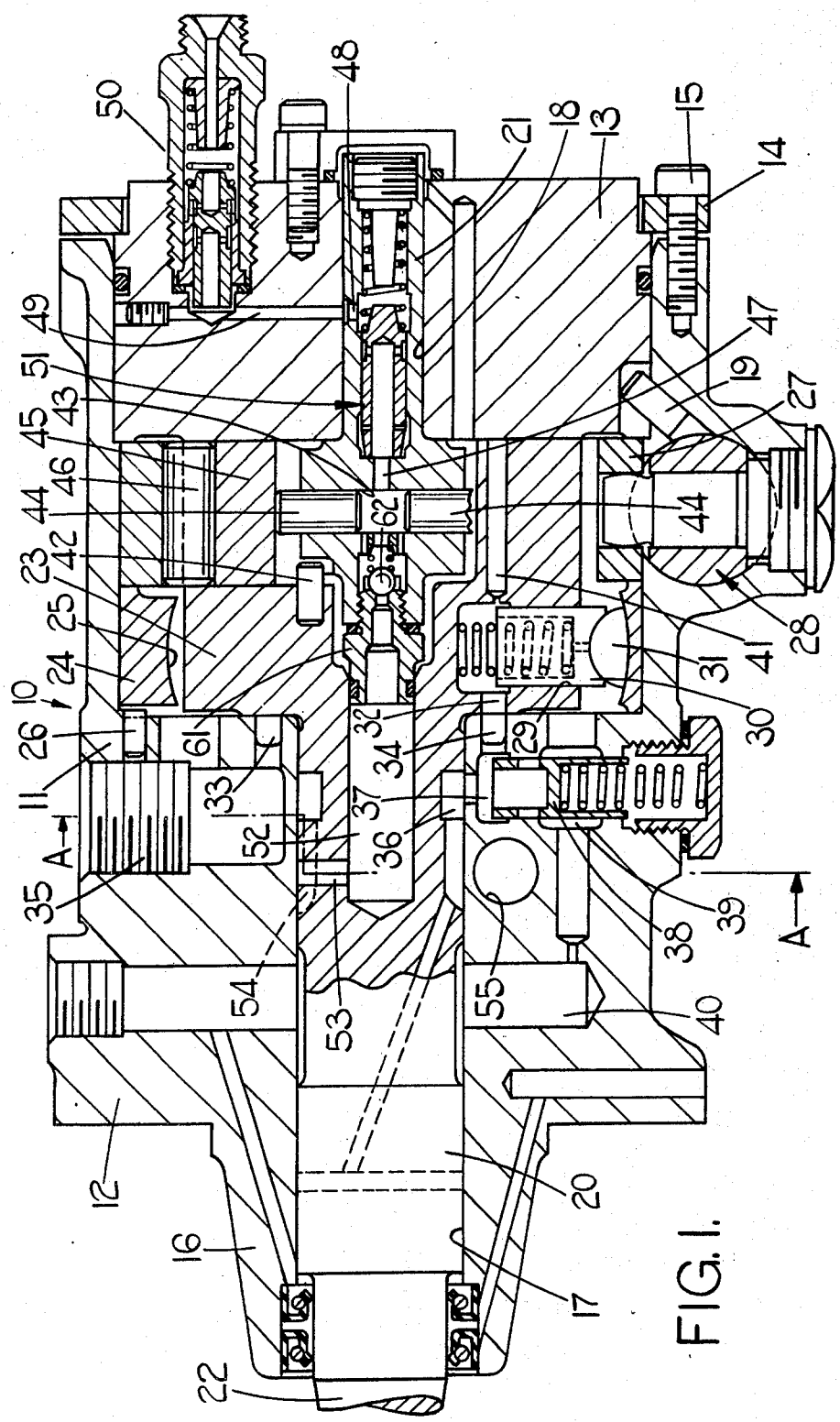
FIG. 1 is a sectional side elevation of the apparatus.

With reference to the drawings, there is provided a body part generally indicated at 10, and which is defined by a cup-shaped portion 11 having a base wall 12 of substantial thickness. The body portion also includes a plug portion 13 which is located within the open end of the cup-shaped portion 11 against a step defined therein.

The plug portion is retained by means of a ring 14 which is secured by means of screws 15 to the wall of the body portion 11.

The base wall 12 of the body portion is provided with an extension 16 and formed within the extension 16 and the base wall 12 is a bore 17. Moreover, formed within the plug portion 13 is a bore 18 concentric with the bore 17 but of a smaller diameter. The plug portion 13 is retained against angular movement within the portion 11 of the body by means of a pin 19.

Located within the bores 17 and 18 is a rotor, and this is formed in two parts 20, 21 respectively. The part 20 extends from the body part, and is provided with a tapered end portion 22 whereby a driving wheel may be mounted thereon. Moreover, the rotor part 20 is provided with an enlarged portion 23 which is accommodated between the inner surface of the base wall 12 of the body portion 11 and the presented face of the plug portion 13 of the body. The side walls of the enlarged portion 23 co-operate with the aforesaid faces to provide a thrust bearing for the shaft and as will be explained, these faces are lubricated by means of fuel.

Positioned adjacent the inner surface of the base wall of the portion 11 of the body and surrounding the enlarged portion 23 of the rotor is an annular ring 24 upon which is formed an eccentrically disposed bearing surface 25. The ring 24 is secured against angular movement within the body part by means of a pin 26 and its axial position is assured by means of a cam ring 27 which is interposed between the ring 24 and the base wall of the plug portion 13 of the body part. The cam ring 27 is movable angularly about the axis of rotation of the rotors by means of an hydraulic servo-mechanism generally indicated at 28.

Formed within the enlarged portion 23 of the rotor 20 are a plurality of radially disposed cylinders 29 in which are located outwardly spring loaded pistons 30. The pistons at their outer ends, mount bearing pads 31 which co-operate with the eccentric surface of the ring 24. The arrangement is such that as the rotor 20 is rotated, inward movement of the pistons will take place due to the eccentric disposition of the surface 25 and outward movement of the pistons will take place under the action of their respective springs.

Each cylinder 29 is provided with a fuel transfer port 32 which extends to the side wall of the enlarged portion 23 for co-operation with kidney shaped inlet and outlet ports 33, 34 respectively formed in the base wall 12. The port 33 communicates with a fuel inlet 35 and the port 34 communicates with an annular gallery 36 which is formed in the periphery of the rotor 20. In addition, the gallery 36 communicates with one end of a cylinder 37 containing a spring loaded relief valve element 38. The cylinder 37 is of stepped form, and has an enlarged portion 39 communicating with a return passage 40 and with the interior of the body part containing the ring 24 and the cam ring 27. In operation, as the rotor 20 is rotated, fuel is drawn into the cylinders 29 by the springs of the respective pistons, the fuel flowing through the port 33 and during continued movement of the rotor the pistons 30 are moved inwardly and fuel is expelled through the port 32 into the gallery 36. The pressure of fuel within the gallery is controlled by the relief valve element and this spills surplus fuel to the interior of the body part and through the passage 40 for return to an external fuel tank. The fuel passing between the ports 32 and the port 34 is under pressure which, in the particular instance, approaches 250 pounds per square inch, and this effects lubrication of the faces of the body part and enlargement containing these ports. The lubrication and pressure balance of the co-operating faces of the enlargement 23 and the plug 13 is effected through passages 41 communicating with the inner ends of the cylinders 29.

The rotor parts 20 and 21 are coupled by means of a pin 42 so that they rotate in synchronism, and formed in the rotor part 21 is a transversely extending bore 43 in which is mounted a pair of pumping plungers 44. Moreover, the enlarged portion 23 of the rotor 20 surrounds the rotor 21 and is provided with a pair of opposed radially extending slots in which are slidably accommodated shoes 45 respectively. The shoes 45 engage the plungers 44 and also carry rollers 46 which engage with the internal peripheral surface of the cam ring 27. Formed on the internal peripheral surface of the cam ring 27 are a plurality of pairs of inwardly extending cam lobes, and these as the rotor parts rotate, impart inward movement to the pumping plungers 44. During such inward movement fuel contained in the bore 43 will be displaced from the bore and will flow through a passage 47 in the rotor 20, the passage 47 extending to a peripheral port 48 on the rotor. The port 48 is arranged to communicate in turn and during successive inward movements of the plungers 44, with a plurality of outlets 49 which are formed in the plug portion 13 of the body part. The outlets, by way of delivery valves 50, communicate with the injection nozzles respectively of the associated engine. Moreover, positioned in the passage 47 is a control valve 51 which includes a spring loaded valve element. The action of the valve element is such that it moves to permit fuel flow through the passage 47 when fuel is expelled from the bore 43, and at the end of such inward movement and when the plungers are permitted to move outwardly, the valve element is returned to the position in which it is shown, partly by the action of its spring, and partly due to flow of fuel at high pressure flowing through the ports 49. The diameter of the bore 18, and therefore the rotor 21 is smaller than in conventional forms of distributor pump. This helps to minimise leakage of fuel at high pressure along the clearance which must be provided between the surfaces of the rotor and bore.

Fuel is supplied to the bore 43 from a chamber 52 which is formed in the rotor 20. This fuel flows past a non-return valve 62. This comprises a spring loaded ball which co-operates with a seating, the seating being formed at the end of a connector member 61 which is in screw thread engagement with the rotor 21 and which extends into and is sealingly engaged with the wall of the chamber 52. For the purpose of sealing engagement an O ring is provided about the member 61.

Figure 2:
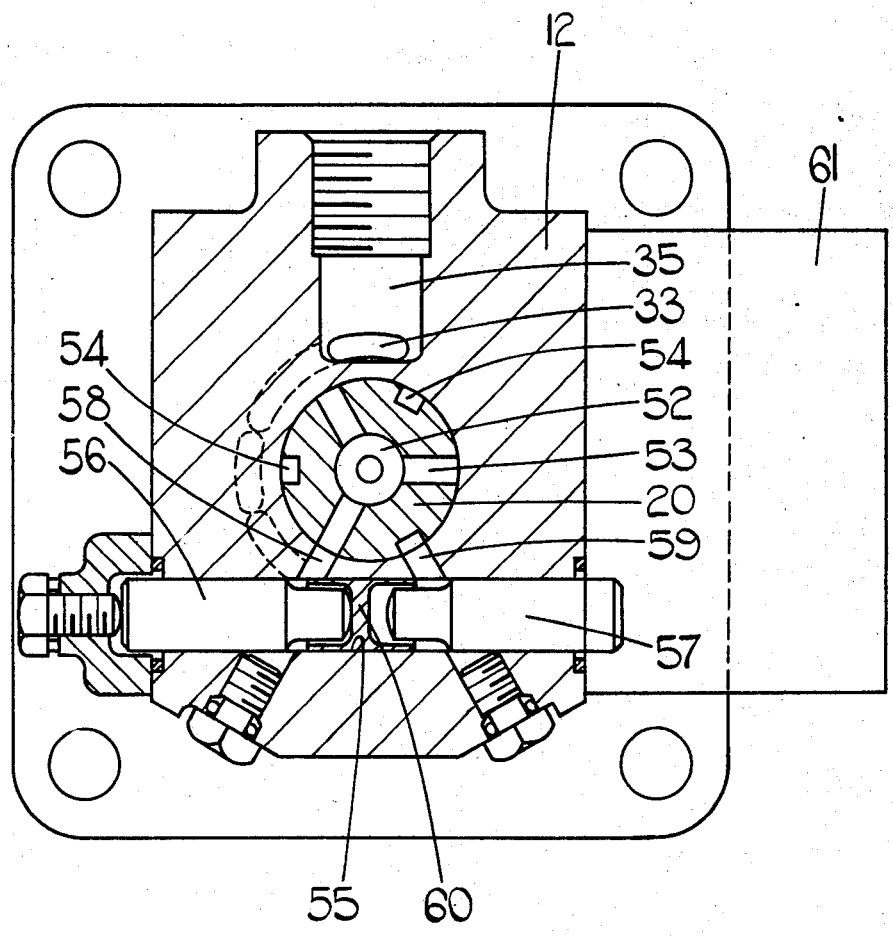
FIG. 2 is a sectional end elevation on the line A—A of FIG. 1.

The chamber 52 communicates, in the present example, with three equi-angularly spaced passages 53 which extend to the periphery of the rotor. Positioned intermediate these passages are grooves 54 which extend from the gallery 36. Moreover, formed in the body part is a bore 55 tangentially disposed to the rotor 20. The opposite ends of the bore 55 are closed by adjustable plugs 56, 57 and extending from the ends of the bore intermediate the plugs are a pair of ports 58, 59. These extend and open out onto the periphery of the rotor 20. The ports 58 and 59 are positioned so that when a groove 54 is in register with one of the ports, the other port will be in register with one of the passages 53 and vice versa. Moreover, accommodated within the bore 55 is a slidable shuttle 60, the extent of movement of which is limited by projections formed on the plugs 56, 57 respectively. In FIG. 2, the setting of the various parts is such that fuel supplied through the port 59 has moved the shuttle 60 into contact with the stop on the plug 56, and as a result of this, fuel has been displaced through the port 58 and one of the passages 53 to the chamber 52. From this chamber the fuel has flowed past the non-return valve 62 into the bore 43. The bore 43 has therefore been supplied with a quantity of fuel which is determined by the movement of the shuttle 60. During continued rotation of the rotor, the plungers 44 will be moved inwardly and fuel expelled from the bore 53 to the associated engine. During the next filling stroke, the port 59 will be brought into register with a passage 53 and the port 58 with a groove 54 and as a result of this, the shuttle 60 will be displaced in the opposite direction, and if there has been no relative adjustment of the plugs 57, the same quantity of fuel will be supplied to the bore 43.

The setting of the plug 56 is determined by an adjustable screw, whilst the setting of the plug 57 is determined by a governor mechanism illustrated in outline at 61. The governor mechanism adjusts the position of the plug 57 in accordance with the quantity of fuel which it is required to supply to the engine, the actual speed of the engine and various other parameters. The governor mechanism may be of any suitable type, but preferably of an electrical type.

It will be noted that the diameter of the rotor portion 20 is larger than that of the portion 21. This is to permit the use of a port size, and this of course applies to the size of the grooves 54 and the passages 53, sufficient to ensure proper filling of the bore 43 in the time available.

It will be noted that any fuel leaking to the right hand end of the rotor portion 21 is collected within a closure cap and returned to the space within the body part, and similarly it will be noted that the end of the rotor portion 20 is provided with seals and any fuel leaking therealong or which may have been supplied for the purpose of lubrication, is returned to the external tank.

It will be understood that an alternative drive arrangement may be utilized. For example the member 61 may be splined to provide the required drive connection between the rotor parts.

I claim:

1. A liquid fuel pumping apparatus for supplying fuel at high pressure to a direct injection internal combustion engine, and comprising: a body part, a cylindrical rotor mounted within the body part and rotatable in synchronism with the engine, a transversely disposed bore formed in the rotor and a pair of pumping plungers housed in the bore, cam means for imparting inward movement to the plungers, first passage means in one part of the rotor communicating with said bore, inlet port means in said body part, a plurality of outlet ports formed in the body part and with which said first passage means registers in turn during successive delivery strokes of the plungers, whereby fuel at high pressure is supplied to the outlets, a fuel feed pump for supplying fuel at low pressure, second passage means in another part of the rotor for registration with said inlet port means, control means for controlling the fuel flow to the inlet port means for said feed pump when said second passage means is in register therewith, and a one way valve incorporated in said second passage means, said one way valve allowing flow of fuel only from the feed pump to said bore, said one part of the rotor having a smaller diameter than said another part of the rotor, whereby said outlet ports are disposed at a smaller radial distance from the axis of rotation of the rotor than said inlet port means.

2. An apparatus as claimed in claim 1 in which said portions of the rotor are formed by dividing the rotor into two separate parts, means being provided to couple the two parts of the rotor so that they rotate together.

3. An apparatus as claimed in claim 2 in which said means comprises a pin offset from the axis of rotation of the rotor.

4. An apparatus as claimed in claim 2 in which the part of the rotor of larger diameter defines a chamber into one end of which extends the part of the rotor of smaller diameter or a connector member, sealing means being provided between the wall of said chamber and said part or connector.

5. An apparatus as claimed in claim 4, in which said chamber forms part of said second passage means.

6. An apparatus as claimed in claim 4 in which the means for controlling the amount of fuel supplied to the bore comprises reciprocable shuttle means housed within the body part of the apparatus.

7. An apparatus as claimed in claim 6 in which said reciprocable shuttle means comprises a cylinder defined in the body part, the axis of said cylinder being disposed at right angles to the axis of rotation of the rotor, a shuttle located in said cylinder, and a pair of stop members in the ends respectively of said cylinder, said stop members acting to limit the extent of movement of the shuttle.

8. An apparatus as claimed in claim 7 in which one of said stop members is adjustable so as to enable the quantity of fuel supplied by the apparatus to be varied.

9. An apparatus as claimed in claim 2 in which the feed pump has a rotary part which is carried on the part of the rotor having a larger diameter.

10. An apparatus as claimed in claim 9 in which the part of the rotor having the larger diameter extends from the body part and is adapted to be driven by the associated engine.

11. An apparatus as claimed in claim 10 in which the part of the rotor of larger diameter has an enlarged portion, the feed pump including a plunger located within a bore in said enlarged portion and actuable by an eccentrically positioned bearing surface formed on a ring mounted within the body part.

12. An apparatus as claimed in claim 11 in which said enlarged portion extends about the part of the rotor of smaller diameter, said enlarged portion being provided with radial slots which accommodate radially movable shoes respectively engageable with said pumping plungers respectively, said shoes mounting rollers respectively engaging said cam means.

13. An apparatus as claimed in claim 11 in which the side faces of said enlarged portion bears against thrust faces defined in the body part.

14. An apparatus as claimed in claim 13 in which the feed pump supplies fuel under pressure to lubricate said faces.

15. A liquid fuel pumping apparatus for supplying fuel at high pressure to a direct injection internal combustion engine, comprising: a body part, a rotor within said body part, a first passage means in said rotor and a co-operating passage means also in said rotor, the portion of the rotor being provided with said first passage means having a diameter smaller than the portion of the rotor in which said co-operating passage means is provided, said portions of the rotor being formed by dividing the rotor into two separate parts, means being provided to couple the two parts of the rotor so that they rotate together, said part of the rotor of larger diameter defining a chamber into one end of which extends the part of the rotor of smaller diameter, sealing means being provided between the wall of said chamber and said part, said chamber forming part of said second passage means, reciprocable shuttle means for controlling the amount of fuel supplied to the bore being housed within said body part, said reciprocable shuttle means comprising a cylinder defined in said body part, the axis of said cylinder being disposed at right angles to the axis of rotation of the rotor, a shuttle located in said cylinder, and a pair of stop members in the ends respectively of said cylinder, said stop members acting to limit the extent of movement of the shuttle, said co-operating passage means comprising a pair of passages extending from the ends of said cylinder and opening onto the periphery of the passage of the rotor of larger diameter, at angularly spaced points, a first passage in said rotor part for registration with said pair of passages in turn, said first passage communicating with said chamber, and a second passage communicating with the outlet of the feed pump, said second passage communicating with one of said pair of passages while the first passage is in communication with the other of said pair of passages and vice versa, and a non-return valve disposed between said chamber and the bore accommodating the pumping plunger.

* * * * *

UNITED STATES PATENT AND TRADEMARK OFFICE
CERTIFICATE OF CORRECTION

PATENT NO. : 3,970,414
DATED : July 20, 1976
INVENTOR(S) : Dorian F. Mowbray

It is certified that error appears in the above-identified patent and that said Letters Patent are hereby corrected as shown below:

[30] Foreign Application Priority Data
January 4, 1974  United Kingdom 361/74

Signed and Sealed this

Eleventh Day of January 1977

[SEAL]

Attest:

RUTH C. MASON
Attesting Officer

C. MARSHALL DANN
Commissioner of Patents and Trademarks